United States Patent
Andres et al.

(10) Patent No.: US 7,203,584 B2
(45) Date of Patent: *Apr. 10, 2007

(54) MULTIPLE-SATELLITE SENSORS ALGORITHM WAKE UP AND RESET STRATEGY FOR AN INFLATABLE RESTRAINT SYSTEM

(75) Inventors: Robert M. Andres, Troy, MI (US); Andreas Knueppel, Pontiac, MI (US); Thomas J. Malbouef, Jr., Grosse Pointe, MI (US); Tobias Tyroller, Regensburg (DE); Gerd Winkler, Regensburg (DE)

(73) Assignee: Siemens VDO Automotive Corporation, Auburn Hills ( * ) Notice: Subject to any disclaimer, the term of this patent is extended or adjusted under 35 U.S.C. 154(b) by 0 days.

This patent is subject to a terminal disclaimer.

(21) Appl. No.: 11/121,878

(22) Filed: May 4, 2005

(65) Prior Publication Data

US 2005/0203689 A1    Sep. 15, 2005

Related U.S. Application Data

(62) Division of application No. 10/443,211, filed on May 22, 2003, now Pat. No. 6,961,645.

(60) Provisional application No. 60/389,583, filed on Jun. 18, 2002.

(51) Int. Cl.
    *G06F 7/00* (2006.01)
(52) U.S. Cl. ........................ 701/45; 280/735
(58) Field of Classification Search ............... 701/36, 701/45–47; 307/9.1, 10.1; 180/268, 271–272, 180/282; 280/734–735, 728.1, 801.1, 802
    See application file for complete search history.

(56) References Cited

U.S. PATENT DOCUMENTS

| | | | |
|---|---|---|---|
| 5,835,007 A * | 11/1998 | Kosiak ...................... 340/436 |
| 6,046,511 A | 4/2000 | Delco |
| 6,324,454 B1 * | 11/2001 | Obata et al. .................. 701/45 |
| 6,347,268 B1 | 2/2002 | Fujita et al. .................. 701/45 |
| 6,363,308 B1 | 3/2002 | Caruso et al. ................ 701/45 |
| 6,371,515 B1 | 4/2002 | Fujishima et al. .......... 280/735 |
| 6,453,224 B1 | 9/2002 | Caruso et al. ................ 701/45 |
| 6,516,259 B2 | 2/2003 | Morell et al. ................. 701/45 |
| 6,559,557 B2 * | 5/2003 | Manlove et al. ........... 307/10.1 |
| 6,561,544 B1 * | 5/2003 | Clancy et al. .............. 280/735 |
| 6,682,094 B1 * | 1/2004 | Laituri et al. .............. 280/735 |
| 6,961,645 B2 * | 11/2005 | Andres et al. ................ 701/45 |
| 2003/0120408 A1 * | 6/2003 | Caruso et al. ................ 701/45 |
| 2003/0132622 A1 * | 7/2003 | Miyata et al. .............. 280/735 |
| 2003/0184447 A1 * | 10/2003 | Otterbach et al. ........ 340/854.9 |
| 2003/0222441 A1 * | 12/2003 | Andres ....................... 280/735 |

FOREIGN PATENT DOCUMENTS

| | | |
|---|---|---|
| EP | 0 911 223 A2 | 4/1999 |
| EP | 0 987 151 A1 | 3/2000 |
| EP | 1182100 A2 * | 2/2002 |
| WO | WO 99 50101 | 10/1999 |
| WO | WO 03/106227 A1 | 12/2003 |

* cited by examiner

OTHER PUBLICATIONS

Search Report, dated Oct. 15, 2003.

*Primary Examiner*—Gertrude A. Jeanglaude

(57) ABSTRACT

An air bag system (12) provides a central controller (14), a multiple of satellite sensors (16) and a multiple of deployable air bags (18). The central controller (14) runs the impact event algorithms. The number of satellites which are allowed to activate algorithms at any one time is limited. The minimum number of satellites required for full protection is the maximum number of satellite sensors allowed to wake up an impact event algorithm at any one time. An order for algorithm wake is also specified since the number of algorithms allowed is less than the total number of satellite sensors.

19 Claims, 3 Drawing Sheets

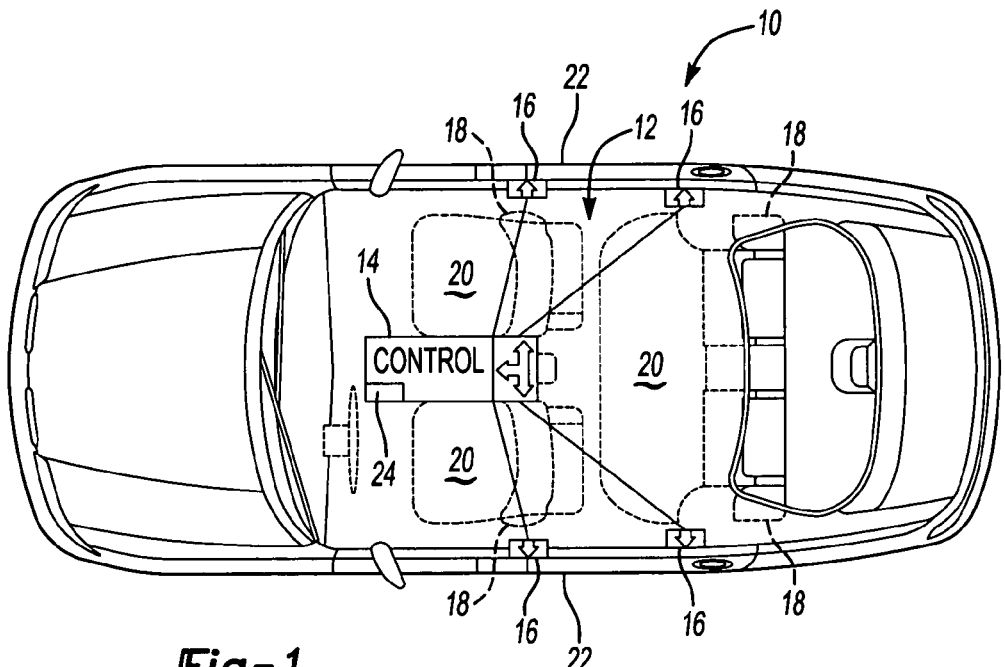
*Fig-1*
| NUMBER OF ROWS | TOTAL NUMBER OF SATELLITES | MAXIMUM NUMBER OF SATELLITES ALLOWED | POTENTIAL RUNTIME SAVINGS |
|---|---|---|---|
| 1 | 2 | 2 | 0% |
| 2 | 4 | 3 | 25% |
| 3 | 6 | 4 | 33.3% |
| 4 | 8 | 5 | 37.5% |
*Fig-2*
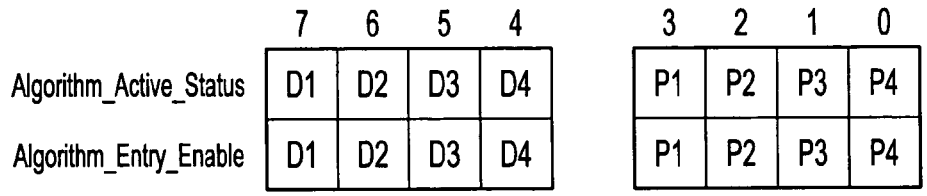
*Fig-4*

```
If (driver side restraints are not already deployed)
{
  If ((algorithm_active_status \ 0x80 = = 0)  // driver-front algorithm is not currently active
  {
      If ((algorithm_entry_enable & 0x80) ! = 0 // algorithm entry is not disabled
    {
      If (D1_VELOCITY>ROW1_WAKE_UP_THRESH) // Wake up driver front-row satellite algorithm
      {
        algorithm_active_status = alogorithm_ active_ status \ 0x80;
        SAT_ALGO_COUNT++;
        If (SAT_ALGO_COUNT= = MAX_ALGO_COUNT) // maximum reached
        {
          algorithm_entry_enable = alogorithm_ entry_ status & alogorithm_active_status;
         }
        }
       }
      }
     }
    }
```

Fig-3

```
If ((algorithm_active_status \ 0x80) ! = 0) // driver-front algorithm is currently active
{
  If (D1_CRASH_SIGNAL< ROW1_RESET_THRESHOLD) // reset threshold for driver front-row satellite
  {
    D1_RESET_TIMER ++;
     If (RESET_TIMER = = ROW1_RESET_TIME) // reset criterion fulfilled
     {
        algorithm_active_status = alogorithm_ active_ status & 0x7f;  // clear algo_active bit for this satellite
        D1_RESET_TIMER = 0;
        SAT_ALGO_COUNT--;
             if (SAT_ALGO_COUNT= = 0) // crash event has ended
        {
           algorithm_entry_enable = 0xff;  // entry of all satellite re-enabled
         }
        }
       }
      else
       {
          D1_RESET_TIMER = 0;
        }
       }
```

Fig-5

MULTIPLE-SATELLITE SENSORS ALGORITHM WAKE UP AND RESET STRATEGY FOR AN INFLATABLE RESTRAINT SYSTEM

BACKGROUND OF THE INVENTION

The present application is divisional of U.S. patent application Ser. No. 10/443,211 filed 22 May 2003 now U.S. Pat. No. 6,961,645, which claims priority to U.S. Provisional Patent Application Ser. No. 60/389,583, filed 18 Jun. 2002.

The present invention relates to an inflatable restraint system, and more particularly to an algorithm which limits the number of satellite sensors which may be active at one time.

Driver side or passenger side supplemental inflatable restraint (SIR) systems typically include an air bag stored in a housing module within the interior of the vehicle in close proximity to the driver and one or more passengers. SIR systems are designed to actuate upon sudden deceleration so as to rapidly deploy an air bag to restrain the movement of the occupants.

More recently, SIR systems are being extended to protect occupants in all rows of the vehicle. Protection of these occupants is accomplished by equipping the vehicle with multiple rows of side impact event satellite sensors which have the ability to provide data and lead the deployment of airbags or other passive safety restraints.

The side impact event satellite sensors may either be a "decision maker" or a "data sender". "Decision maker" satellites are more expensive because they require a microprocessor to run an algorithm. "Data sending" satellites are preferred from a cost perspective because they do not require a microprocessor. The data sending satellites communicate raw data to a central controller, which contains a microprocessor for executing the algorithm.

The central controller is responsible for running all the necessary impact event algorithms. This may include algorithms for front/rear impact events, algorithms for rollover events, and algorithms for side impact events. The controller must have enough throughput to execute all of these algorithms while still providing normal diagnostic functions. Therefore, the required runtime for each algorithm must be kept as low as possible.

Each row of side impact event protection usually requires two impact event satellite sensors in order to deliver a desired level of performance. One satellite is for the driver side and one is for the passenger side. Each satellite has the ability to wake up an algorithm in the central controller. Therefore, a car with two rows of side protection would have four satellites that may try to run four side algorithms simultaneously.

Disadvantageously, running numerous algorithms could lead to microprocessor runtime issues. The task may be further complicated due to the aggressive deploy times required for side impact events.

Accordingly, it is desirable to provide a wake up and reset strategy, which minimizes the runtime required by the satellite sensor algorithms.

SUMMARY OF THE INVENTION

The air bag system according to the present invention provides a central controller, a multiple of satellite sensors and a multiple of deployable air bags. The satellite sensors transmit data to the central controller which runs side algorithms to sense side impact events.

The central controller runs the necessary impact event algorithms. Therefore, the required runtime for each algorithm must be kept as low as possible as running numerous algorithms may lead to microprocessor runtime issues. The present invention minimizes runtime by limiting the number of satellites which are allowed to activate algorithms at any one time. The minimum number of satellites required for full protection is the maximum number of satellite sensors allowed to wake up an impact event algorithm at any one time. An order for checking satellite sensor wake up is also specified since the number of algorithms allowed is less than the total number of satellite sensors.

The present invention therefore provides a wake up and reset strategy, which minimizes the runtime required by the satellite sensor algorithms.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1 is a schematic view of an exemplary vehicle embodiment for use with the present invention;

FIG. 2 is a chart comparing satellites which may be active according to the present invention;

FIG. 3 provides pseudo code for an algorithm wake up strategy according to the present invention;

FIG. 4 illustrates status bytes for an "algorithm_entry_enable" byte and an "algorithm_active_status" relative to an occupant location;

FIG. 5 provides pseudo code for an algorithm-reset strategy according to the present invention.

DETAILED DESCRIPTION OF THE PREFERRED EMBODIMENT

Figure 6:
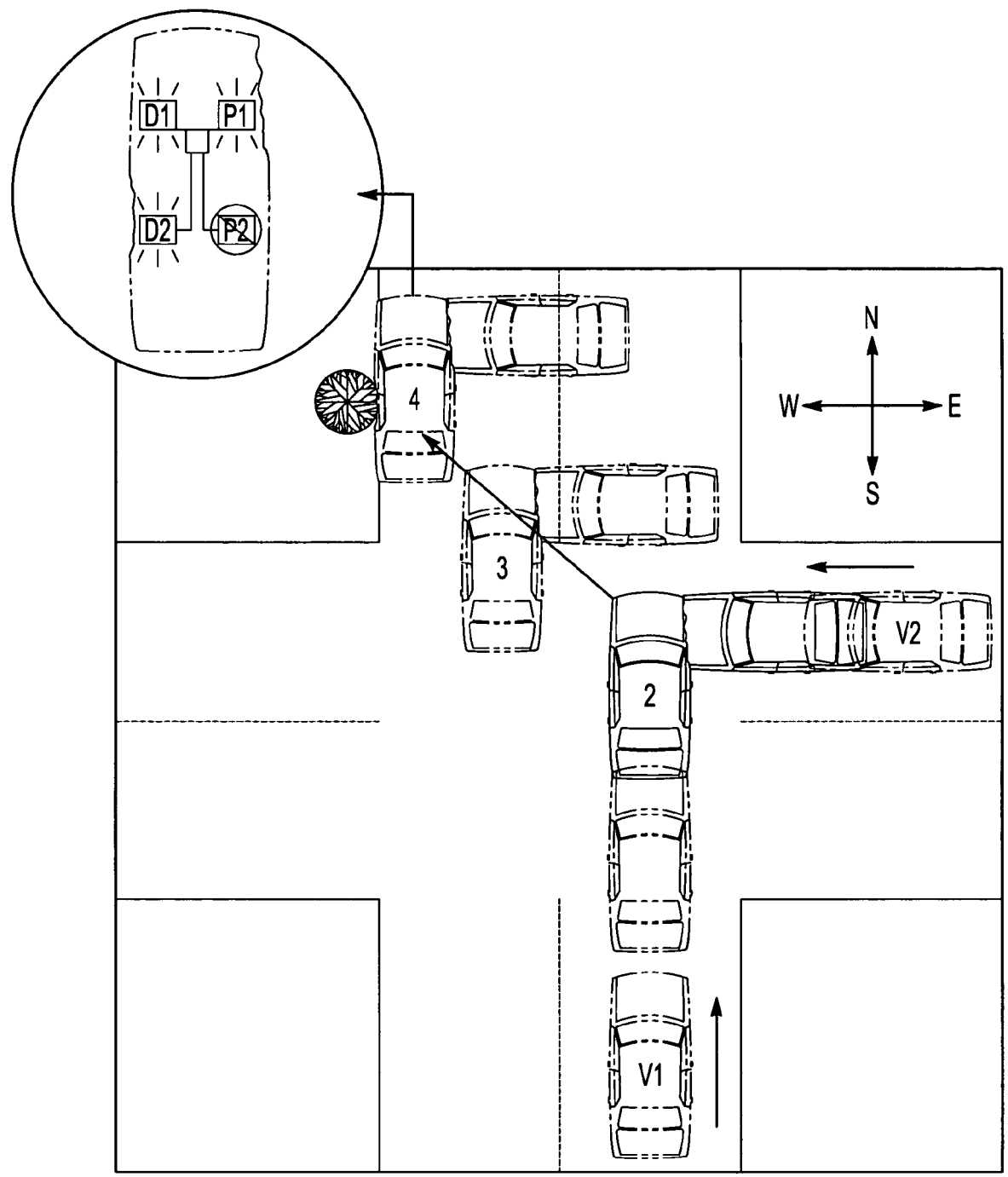
FIG. 6 is a graphical representation of an impact event.

FIG. 1 illustrates a general schematic view of a vehicle 10 having an air bag system 12. The air bag system 12 generally includes a central controller 14, a multiple of remote satellite sensors 16 and a multiple of deployable air bags 18. Preferably, one or more air bags 18 are located to the side of a vehicle seat 20.

The satellite sensor 16 communicates with the controller 14 to sense a deploy event such as a side impact. In response to signals from the satellites sensor 16 the controller 14 determines whether to deploy the air bag 18 through logic stored in the controller 14. The satellite sensors 16 are preferably located in the side 22 of the vehicle 10 adjacent the related air bag 18. It should be understood that other air bag arrangements and sensor locations will likewise benefit from the present invention.

The satellite sensors 16 may be based on several different sensing principles such as acceleration and pressure. The satellite sensors 16 may also either be a "decision maker" or a "data sender". "Decision maker" satellite sensors may be more expensive because they require a self-contained microprocessor to run an algorithm. "Data sending" satellites are preferred from a cost perspective because they do not require a microprocessor as they simply communicate raw data to the central controller 14, which contains a microprocessor for executing an algorithm for each satellite sensor.

The central controller 14 is responsible for running all the necessary impact event algorithms for each of the satellite sensors 16. This may include algorithms for front/rear impact events, algorithms for rollover events, and algorithms for side impact events. The controller 14 must have enough throughput to execute all of these algorithms simultaneously and still carry out normal diagnostic functions. Therefore, the required runtime for each algorithm is preferably maintained as low as possible.

Each row of seating which is to have side impact protection utilizes two satellite sensors 16 in order to deliver a desired level of performance. One satellite 16 is for the driver side and one is for the passenger side for each row or seating. Each satellite operates to wake up an impact event algorithm in the central controller 14 as generally known. Therefore, a vehicle 10 with two rows of seating has four satellite sensors 16 and the central controller 14 may attempt to run four algorithms if simultaneously communicated with by each satellite sensor 16.

Running numerous algorithms may lead to microprocessor runtime issues. The present invention minimizes runtime through limiting the number of satellite sensors which are allowed to activate algorithms at any one time. As it is preferred to maintain full protection for both sides of the vehicle in case an impact occurs simultaneously on both sides, the minimum number of satellites required, which may enter an impact event algorithm at any one time while still providing for full vehicle protection is limited as follows:

Minimum number of satellites=(Total number of satellites/2)+1

The "+1" allows a satellite sensor 16 on an opposite side of an impact event to wake up if the opposite side is also struck. To reduce runtime, the minimum number of satellites required for full protection is the maximum number of satellite sensors 16 allowed to wake up an impact event algorithm at any one time. FIG. 2 summarizes the maximum number of satellites allowed to be active in an algorithm at the same time for up to four rows of seating.

Referring to FIG. 3, pseudo code for the algorithm wake up strategy for a driver-side front row satellite 16 is provided. The pseudo code represents the logic within the central controller 14 for operation of the air bag 18 in response to signals from the satellite sensor 16. Implementation of the present invention preferably utilizes an algorithm wake up criterion, an algorithm reset criterion, and an active algorithm counter. Other status flags may also be utilized.

The algorithm wake up criterion is selected such that a satellite sensor 16 wakes up the impact event algorithm within the central controller 14 only if its impact event signal exceeds a pre-defined limit in the impact event direction. This minimizes unstruck satellites from entering the impact event algorithm before struck satellites. One preferred signal is velocity with offset of the satellite sensor. It should be understood that additional or alternative signals may also be utilized. Any signal that is used for the purpose of impact event algorithm wake up, however, must be calculated at all times.

The order of checking for impact event algorithm wake up is also important since the number of impact event algorithms allowed is less than the total number of satellite sensors 16 because it may be possible that all satellite sensors 16 may meet their wake up criteria at the same loop. Preferably, the front row driver position is checked first, followed by the front row passenger. Next, the second row driver and then the second row passenger are checked, and so on. Priority is given to the front rows because they are more likely to have occupants.

When a satellite sensor wakes up an impact event algorithm, a counter 24 (FIG. 1) is preferably incremented to keep track of the number of active satellite sensors 16. If the maximum number of active satellite sensors 16 (FIG. 2) is reached, then no further side algorithms are allowed to initiate. When a satellite sensor's algorithm resets the counter decrements.

Satellite sensors 16 are preferably prevented from entering the impact event algorithm in the middle of an impact event because this may lead to unpredictable behavior. Therefore, satellite sensors 16 are preferably prevented from starting an impact event algorithm unless known to be "quiet" just before the attempt to wake up. This is preferably achieved by maintaining two status bytes, which contain one bit for each satellite sensor 16. One status byte, which may be called "algorithm_active_status", indicates whether a satellite sensor's 16 algorithm is currently active. A bit value of '1' or TRUE indicates that the corresponding satellite sensor's algorithm is currently active. The other status byte, which may be called "algorithm_entry_enable", indicates which satellites are allowed to enter the algorithm. This bit is set to '1' or TRUE if this satellite is allowed to start an algorithm. This bit is cleared to prevent this satellite from starting an algorithm.

Referring to FIG. 4, the status bytes have the same format and are preferably set up such that the left nibble (most significant) will be assigned to the driver side satellites. The right nibble (least significant) is assigned to the passenger side satellite sensors 16.

During normal operation, i.e., no impact event, the "algorithm_entry_enable" byte contains all ones and the "algorithm_active_status" byte contains all zeros. No side algorithms are currently active and all satellite sensors 16 may start an algorithm. During a impact event, any satellite sensor 16 may enter or exit its algorithm as long as the maximum number of allowable active satellites has not been reached (FIG. 2).

As the first satellite sensor 16 wakes up, its respective bit in the "algorithm_active_status" byte gets set to '1', the "algorithm_entry_enable" byte remains unchanged, and the active satellite counter 24 (FIG. 1) is incremented. When the maximum number of allowable satellites are simultaneously active in their algorithms, the "algorithm_entry_enable" status byte is masked (logical AND) by the "algorithm_active_status" byte. The satellite sensors 16, which are not currently in the algorithm, have their bits cleared and are thereby prevented from entering for the remainder of the impact event.

When a satellite sensor's algorithm ends, its bit in the "algorithm_active_status" byte is cleared and the active satellite counter decrements. The "algorithm_entry_enable" byte is reset to all ones after the last satellite sensor resets out of its algorithm, thereby indicating that the impact event has ended. For example only, in a vehicle with six side impact event satellites, only the first four satellites that start and remain in an algorithm would be allowed to be active in the algorithm for the entire impact event. These first four satellites have the ability to reset and reenter their respective algorithms during a single impact event. The fifth and sixth satellites are prevented from entering their algorithms until the current impact event has expired.

Referring to FIG. 5, pseudo code for an algorithm-reset strategy for the driver-side front row satellite is provided. The satellite sensors should reset out of their algorithm when their impact event signals have quieted down. Preferably, identification of a low signal for a given period of time is utilized therefor, however, several methods may alternatively or additionally be provided. This signal is preferably an acceleration, a velocity with offset, or an averaged acceleration.

Referring to FIG. 6, a representative impact event is illustrated. Two vehicles V1 and V2 are approaching an icy intersection, V1 going north and V2 going west. At the intersection V2 strikes V1 perpendicularly ("T-bone") and pushes it into a tree T off the side of the road. If V1 has two rows of side protection (i.e. four side impact event satellite sensors) and only three out of the four satellites may execute an algorithm at any one time, the following time line may happen.

At time 1 (Pre-impact event), V1 is driving under normal conditions. All satellite sensors are quiet (i.e. no side algorithms are active) and therefore all satellite sensors are enabled to wake up.

At time 2, V1 is struck on the right side by the V2. This causes both front row and second row satellites on the right side to activate their algorithms. Therefore, only one more satellite sensor 16 on the opposite side is allowed to enter its algorithm. This impact is not severe enough to require a side airbag deployment command.

At time 3, V1 and V2 slide together along the icy road in the northwest direction. During this time, both right side satellite sensors 16 become quiet and eventually reset. After reset, the entire vehicle is quiet and therefore all satellite sensors are enabled to activate.

At time 4, V1 is pushed into the tree T near the front row, left side satellite sensor, which wakes up its impact event algorithm. The impact event forces propagate quickly to the second row, left side satellite sensor, which also wakes up. The sudden stop against the tree T causes additional forces to occur on the right side where the two vehicles are joined together. These forces are large enough to activate both satellite sensors on the right side, however, only three satellite sensors may be active at any one time (FIG. 2). Therefore, the front row passenger side is checked first for algorithm activation due to priority. This front row passenger side satellite sensor does wake up its algorithm and becomes the third and final active satellite for this event.

The second row, passenger side satellite is disabled until the entire vehicle is quiet (i.e., no side algorithms are active).

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of limiting the run time of an airbag system comprising the step of:
   (a) limiting a total number of satellite sensors which enter an impact event algorithm of a central controller during an impact event to: (total number of satellite sensors/ 2)+1.

2. A method as recited in claim 1, further comprises the step of:
   (b) tracking each satellite sensor entry and exit from the impact event algorithm.

3. A method as recited in claim 1, further comprises the step of:
   (b) tracking when each satellite sensor is active within the impact event algorithm.

4. A method as recited in claim 1, further comprises the step of:
   (b) maintaining two status bytes for each satellite sensor.

5. A method as recited in claim 4, further comprises the step of:
   (c) maintaining an $algorithm_{13}$ active_status byte defining whether the satellite sensor is currently active; and
   (d) maintaining an algorithm_entry_enable byte defining whether the satellite sensor is available to enter the impact algorithm.

6. A method as recited in claim 1, further comprises the steps of:
   (b) checking a front row driver position for impact event algorithm wakeup; and
   (c) checking a front row passenger position for impact event algorithm wakeup after said step (b).

7. A method as recited in claim 1, further comprises the step of:
   (b) permitting wake up of only one satellite sensor on a vehicle side opposite an impact event.

8. A method as recited in claim 1, wherein said step (a) comprises:
   locating at least one of the satellite sensors in a side of a vehicle.

9. A method as recited in claim 1, wherein said step (a) comprises:
   locating each of the satellite sensors in a side of a vehicle adjacent a respective airbag.

10. A method as recited in claim 1, wherein said step (a) comprises: locating the front row driver position satellite sensor within a side of a vehicle.

11. A method as recited in claim 10, wherein said step (a) comprises:
    locating the front row driver position satellite sensor adjacent a respective airbag.

12. A method of limiting the run time of an airbag system comprising the steps of:
    (a) checking a front row driver position satellite sensor for impact event algorithm wakeup;
    (b) checking a front row passenger position satellite sensor for impact event algorithm wakeup after said step (a); and
    (c) limiting a total number of satellite sensors which enter an impact event algorithm of a central controller during an impact event to: (total number of satellite sensors/ 2)+1.

13. A method as recited in claim 12, further comprises the step of:
    (d) maintaining two status bytes for each satellite sensor.

14. A method as recited in claim 13, further comprises the step of:
    (e) tracking each satellite sensor entry and exit from the impact event algorithm with one of the two status bytes.

15. A method as recited in claim 13, further comprises the step of:
    (e) tracking when each satellite sensor is active within the impact event algorithm with one of the two status bytes.

16. A method as recited in claim 13, further comprises the step of:
    (e) maintaining an algorithm_active_status byte defining whether the satellite sensor is currently active; and (f) maintaining an algorithm_entry_enable byte defining whether the satellite sensor is available to enter the impact algorithm.

17. A method as recited in claim 12, further comprises the step of:
 (d) permitting wake up of only one satellite sensor on a vehicle side opposite an impact event.

18. A method of limiting the run time of an airbag system comprising the steps of:
 (a) limiting a total number of satellite sensors which enter an impact event algorithm of a central controller during an impact event to: (total number of satellite sensors/2)+1;
 (b) maintaining two status bytes for each satellite sensor;
 (c) maintaining an algorithm_active_status byte defining whether the satellite sensor is currently active; and
 (d) maintaining an algorithm_entry_enable byte defining whether the satellite sensor is available to enter the impact algorithm.

19. A method of limiting the run time of an airbag system comprising the steps of:
 (a) checking a front row driver position satellite sensor for impact event algorithm wakeup;
 (b) checking a front row passenger position satellite sensor for impact event algorithm wakeup after said step (a);
 (c) limiting a total number of satellite sensors which enter an impact event algorithm of a central controller during an impact event to: (total number of satellite sensors/2)+1;
 (d) maintaining two status bytes for each satellite sensor;
 (e) maintaining an algorithm_active_status byte defining whether the satellite sensor is currently active; and
 (f) maintaining an algorithm_entry_enable byte defining whether the satellite sensor is available to enter the impact algorithm.

\* \* \* \* \*